United States Patent
Wu

(10) Patent No.: US 8,466,651 B2
(45) Date of Patent: Jun. 18, 2013

(54) MULTIFUNCTIONAL COMPUTER RECHARGEABLE BATTERY APPLICATION SYSTEM AND APPLICATION METHOD THEREOF

(76) Inventor: Wei Wu, Guangzhou (CN)

( * ) Notice: Subject to any disclaimer, the term of this patent is extended or adjusted under 35 U.S.C. 154(b) by 297 days.

(21) Appl. No.: 12/995,048

(22) PCT Filed: May 4, 2009

(86) PCT No.: PCT/CN2009/071627
§ 371 (c)(1),
(2), (4) Date: Nov. 29, 2010

(87) PCT Pub. No.: WO2009/143737
PCT Pub. Date: Dec. 3, 2009

(65) Prior Publication Data
US 2011/0074338 A1 Mar. 31, 2011

(30) Foreign Application Priority Data
May 30, 2008 (CN) .......................... 2008 1 0028412

(51) Int. Cl.
*H02J 7/00* (2006.01)

(52) U.S. Cl.
USPC ........................................................ 320/103

(58) Field of Classification Search
USPC .......................................................... 320/103
See application file for complete search history.

(56) References Cited

U.S. PATENT DOCUMENTS

| | | | | |
|---|---|---|---|---|
| 5,278,487 A | * | 1/1994 | Koenck | 320/132 |
| 5,333,116 A | * | 7/1994 | Hawkins et al. | 361/679.06 |
| 7,821,228 B2 | * | 10/2010 | Zhu et al. | 320/114 |
| 7,863,856 B2 | * | 1/2011 | Sherman et al. | 320/103 |
| RE42,333 E | * | 5/2011 | Yang | 320/103 |

FOREIGN PATENT DOCUMENTS

WO PCT/CN2009/071627 8/2009

* cited by examiner

*Primary Examiner* — M'Baye Diao
(74) *Attorney, Agent, or Firm* — Global IP Services; Tianhua Gu

(57) ABSTRACT

A multifunctional computer chargeable battery application system and its application method are provided. The multifunctional computer chargeable battery application system includes a computer unit, a chargeable battery, a computer interface connected to the chargeable battery with the computer unit so that the battery is used to supply power to the computer unit or charge the computer unit, and an extension application functional module, wherein the battery is used to supply power to or charge the extension application functional module, and the extension application functional module is combined together with the chargeable battery by an embedding mode into a whole, or combined together with the chargeable battery through a detachable connection.

10 Claims, 2 Drawing Sheets

MULTIFUNCTIONAL COMPUTER RECHARGEABLE BATTERY APPLICATION SYSTEM AND APPLICATION METHOD THEREOF

CROSS REFERENCE TO RELATED PATENT APPLICATION

The present application is the US national stage of PCT/CN2009/071627 filed on May 4, 2009, which claims the priority of the Chinese patent application No. 200810028412.0 filed on May 30, 2008, which application is incorporated herein by reference.

FIELD OF THE INVENTION

The present invention relates to the computer field, the electrochemistry technical field, the communication technical field and the network technical field, and in particular to a multifunctional computer rechargeable battery application system and an application method thereof.

BACKGROUND OF THE INVENTION

With the development of communication technology, telecommunication service demands evolve into integrated information services over merged fixed and mobile networks and over merged voice and Internet applications. A wireless wideband network terminal integrated with voice/data communication will bring a high value.

At present, more and more moderns requires mobile business. Persons hope to perform voice communication and Internet access whenever and wherever such as often activity and stayed sites including airports, hotels, leisure squares of a city area, cafeterias, railway stations and suburban parks without any limitation of geographical location.

In addition, the PC miniaturization and multifunctionality has become a general trend. The 30-ton and room-sized computer has become a less 500 g portable laptop or pocket PC, which may bring some new application problems, such as the small display area. Also, function integration of a communication device, a commonly used periphery and other devices has been put on the agenda.

Taking the integration of functions of mobile phones, there are two solutions at present: one is implemented by a Personal Digital Assistant (PDA) or an intelligent mobile phone, and the other is implemented by combining the mobile phone and a portable computer.

The PDA mobile phone or the intelligent mobile phone is implemented by integrating PDA functions into the mobile phone through the embedded system, so as to implement personal information management such as contact, task, schedule and note, to implement Internet applications including Internet surfing and email transmission/reception mainly for processing words and small pictures. However, the basic architecture of the PDA mobile phone is different from the X86 architecture of the general computer in the disadvantages of poor hardware configuration, close and fixed software, dis-unified standards, poor intercommunication, poor extensibility and complex operations, which makes the PDA mobile phone "can access the Internet but is not suitable for accessing the Internet". For example, for a large-sized webpage with hybrid pictures and words such as http://www.sina.com, http://www.sohu.com, http://www.qq.com, the PDA mobile phone can usually display concentratedly only words and a part of small pictures and can not provide consumers with full internet experience that is offered by a desktop computer, moreover, hundreds of mega-sized files can not be downloaded and played due to limited memory. If the PDA mobile phone is applied in the wideband mobile Internet, the above structural deficiency results in a primary hardware bottle of download speed and network application.

In those countries implementing the 3G/3.5G communication technology, many people adopt the mobile solution of a common laptop combining with a mobile phone. That is, the mobile phone is used to accomplish voice communication and PIM management, and the laptop is used to accomplish the computation of wideband Internet access and mobile business. This solution has disadvantages of respective independent functions, requisite two sets of power systems, a high purchase cost, a high use cost and dis-unified management of voice and data.

SUMMARY OF THE INVENTION

The present invention provides a multifunctional computer rechargeable battery application system and an application method thereof, implementing multifunctional integration. Moreover, one rechargeable system can concurrently supply power to a computer unit and an extension application function module and extend multifunctional applications, implementing application extension functions of miniaturized common peripheries and communication devices, which brings the advantages of reduced cost, convenient carrying and effective resource integration.

In view of the above, the present invention provides the following technical solutions:

A multifunctional computer rechargeable battery application system, comprising: a computer unit, a rechargeable battery of the computer, and a computer interface adapted to connect the rechargeable battery and the computer so as to make the rechargeable battery to supply power to the computer unit or recharge the computer unit, wherein the computer unit is configured to be a computer function module of a portal laptop or a computer function module of a pocket computer, and the multifunctional computer rechargeable battery application system further comprises an extension application function module, wherein the rechargeable battery is configured to supply power to the extension application function module or recharge the extension application function module, and the extension application function module is integrated with the rechargeable battery in an embedded mode or combined with the rechargeable battery in a detachable mode.

A multifunctional computer rechargeable battery application method, comprising:

configuring a computer unit to be a computer function module of a portal laptop or a computer function module of a pocket computer;

providing a rechargeable battery and a computer interface adapted to connect the rechargeable battery and the computer unit so as to make the rechargeable battery to supply power to the computer unit or recharge the computer unit;

providing an extension computer interface adapted to connect the rechargeable battery and an extension application function module so as to make the rechargeable battery to supply power to the extension application function module or recharge the extension application function module; and integrating the extension application function module with the rechargeable battery in an embedded mode or combining the extension application function module with the rechargeable battery in a detachable mode, and implementing multifunctional applications in combination with respective functions of the computer unit and the extension application function module.

Compared with the prior art, the present invention has the following advantageous effects:

The computer unit according to the present invention is a computer function module of a portal laptop or a computer function module of a pocket computer. The rechargeable battery supplies power to the connected extension application function module while supplying power to the computer unit. In addition, the present invention implements multifunctional integration and extension applications by combining the respective functions of the computer unit and the extension application function module, which brings the advantages of reduced cost, convenient carrying and effective resource integration. The present invention implements application extension functions of common peripherals and communication devices when the laptop is enough small to be placed in a pocket, and implements full inlaying (in an embedded mode or a detachable mode), miniaturization and integration of the pocket computer and any of common peripheries, communication devices and other devices.

DETAILED DESCRIPTION OF THE INVENTION

The computer and the extension application function module according to the present invention share one rechargeable battery, which not only reduces the cost but also is portable.

It should be noted that the extension application function module according to an embodiment of the present invention may be a projector module, a mobile phone module, an interphone module, a scanner module, a printer module, a GPS module or a micro-optical drive module, and the rechargeable battery provides a power interface or a recharge power interface corresponding to the projector module, the mobile phone module, the interphone module, the scanner module, the printer module, the GPS module or the micro-optical drive module. In addition, in practical implementation, the extension application function module can be fully embedded in the computer. For example, the extension application function module and the computer are integrated with the rechargeable battery in an embedded manner, i.e., the extension application function module is embedded in the rechargeable battery body to be as a part of the rechargeable battery body, or, the extension application function module and the computer unit are integrated with the rechargeable battery in a detachable manner, i.e., the extension application function module is detachable from the rechargeable battery body, Assembly in the computer for carrying, and taken out of the rechargeable battery body for use.

The present invention is described in detail hereinafter by taking the extension application function module as the mobile phone module.

Figure 1:
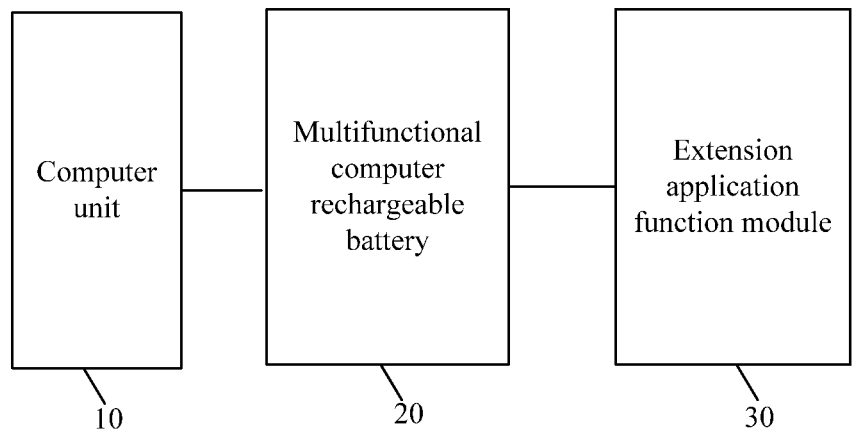
FIG. 1 is a composition diagram of a multifunctional computer rechargeable battery application system according to an embodiment of the present invention.
Figure 2:
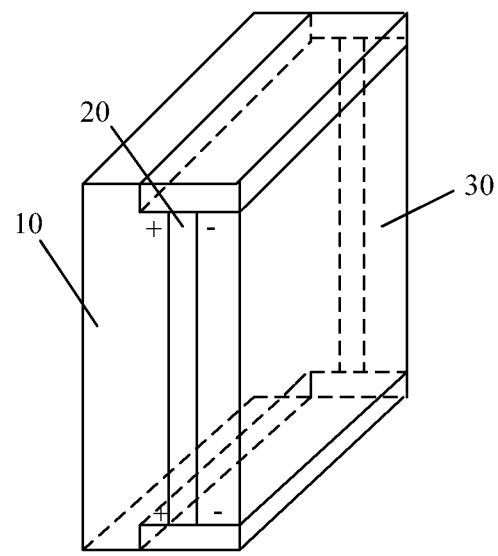
FIG. 2 is a perspective structural diagram of a multifunctional computer rechargeable battery application system according to an embodiment of the present invention.

FIG. 1 and FIG. 2 are a diagram of a multifunctional computer rechargeable battery application system according to an embodiment of the present invention and a perspective structural diagram of a multifunctional computer rechargeable battery application system according to an embodiment of the present invention respectively.

The multifunctional computer rechargeable battery application system according to this embodiment includes a computer unit 10, a multifunctional computer rechargeable battery 20 and an extension application function module 30. The extension application function module 30 is connected to the computer unit 10 through the rechargeable battery 20, the extension application function module 30 share the rechargeable battery 20 with the computer unit 10.

The rechargeable battery 20 may be a 11.1V, 6000 ma Li battery.

If the extension application function module 30 in this embodiment is a mobile phone module, the computer unit 10 may be designed to be a computer function module of a portable laptop or a pocket computer. The application system may be used in a 2G or 3G/4G network to implement synchronous processing of voice and data. In an indoor environment such as office, home, cafeteria, airport or hotel, a network adapter can be used to perform ADSL wired Internet access and WiFi wireless Internet access. While the computer unit 10 processes data traffic, the mobile phone module dials or answers a common phone, to implement the synchronous processing of voice and data. The following is described for the 2G and 3G/4G.

In case of 3G/4G voice and data services can be supported concurrently at a certain carrier, and thus in an outdoor environment the mobile phone module may be used as a modem of a Wireless Wide Area Network (WWAN) In this case, the mobile phone module processes voice stream while the portable laptop or pocket computer processes data stream at the carrier, both of which do not interfere with each other. When a call is being answered, it does not need to interrupt the program of downloading or uploading data. The User Datagram Protocol (UDP) may be used for transmitting realtime data stream such as voice and video stream. The Transmission Control Protocol/Internet Protocol (TCP/IP) may be used for transmitting data packets. If the user chooses to apply priority to the UDP packets, a better voice communication can be implemented by changing the radio communication protocol. In addition, the user may define the priority of the UDP packets as required, so as to ensure that sufficient bandwidth is reserved for the UDP packets. In case of no UDP packets, this bandwidth can be occupied by other data stream.

In practical implementation, the computer unit 10 includes a computer operating system such as XP Tablet, a computer system memory such as RAM 1G, a computer processor such as CPU 1.6G, and a storage such as 1.8 inch harddisk HD 30G-120G In practical implementation, the mobile phone module includes a mobile phone operating system such as Windows Mobile, a computer processor such as the processor MCU 400M, a mobile phone storage such as ROM 64M, and a mobile phone system memory such as RAM 64M.

A shared storage may be arranged in the computer unit 10 for storing critical data and critical information such as communication information, multimedia files and security certificates and not storing unrelated application software. The shared storage may be a Solid State Disk (SSD), which is read as a memory card in a mobile phone mode and is defaulted as F disk in a computer mode. The format for reading and storing of the shared storage may be read, modified, and of which the priority is set. Accordingly, complex input may be operated on the computer unit 10, and simple input may be operated on the mobile phone module. The SSD adopts a FLASH chip as storage medium, and the normal use of the SSD can not be affected even in the case of high speed movement and turnover and inclination. Even if the laptop is expected to fall down or collide with a hard matter, the possibility of losing data is reduced to a minimum and a better shock-proof effect is provided. The SSD has advantages of long-term data storage, fast search speed for documents, saved consumption of system power, durable service, shock-proof and good reliability.

In addition, the computer unit 10 may be provided with a Hard Disk Drive (HDD) for storing information except for predefined critical data. The cost of the HDD is low, and the cost of the SSD is relative high. In the solution according to the present invention, a 1G-4G SSD is adopted to store critical data such as information including communication-like information, multimedia information-like and security certificate-like information while the HDD is adopted to serve as a large-capacity hard disk in a mobile environment, thereby providing low-cast mass storage, and secure and reliable protection of the critical data, and reducing power consumption, to adapt to the mobile business environment.

The security certificate-like information refers to network applications requiring security certificates, such as Online banking, Internet securities, company internal authorization, government internal authorization, which may be used by many users.

It should be noted that different solutions according to the present invention may be adopted in different network environments. In the 2G environment, the VOIP free wideband network telephone can implement voice service in case of indoor, the pay-voice call can implement voice service in case of outdoor, thereby reducing the call charge to a maximum extent. In the 3G/4G environment, the VOIP free wideband network telephone can implement domestic and international toll call and city call in case of indoor and outdoor, thereby realizing full fee call. In addition, the subscriber terminal system according to the present invention, as a WLAN/3G double-mode terminal, is accessed preferably by WLAN in the coverage area of WLAN because in this mode the user spends less service tariff and the bandwidth for data service is more sufficient. In case of departing from the coverage area of WLAN, the terminal performs a handoff to the 3G network automatically, thereby implementing the continuity between WLAN and 3G. In fact, this is a call service with better service and less charge.

The VOIP may be almost applied to any sites requiring voice communication: communication between offices, complex point-to-multipoint teleconference, and white board system, etc. The VOIP may be not only based on a realtime working mode but also provide storage-forwarding voice service. Also, the two modes of realtime and storage-forwarding should be compatible and interoperable.

In addition, when a portable subscriber terminal transmits information, it can binds an email box in a virtual world and a mobile phone number in the real world to serve as a personal identification code, and thus short messages and emails transmitted from the user carry an encrypted identification code containing the bound email box and mobile phone number. Only if an opposite party returns the same identification code, the user receives the returned information, otherwise the user rejects to receive any returned information. The identification code can not only reduce junk mails and junk short messages, but also serve as a personal identification mark of Online banking, Internet securities, Online forum and blog or a password of authentication or service verification management, which greatly enhances credit system construction over Internet and facilitates application of electronic business. Similarly, Online banking, Internet securities, Online forum and blog adopt the identification code and decrypted the identification code to obtain the email address, the IP address and the mobile phone number of the user, so as to accurately determine the status and position of the user in the virtual world and real world, thereby reducing network crime and network violence.

In addition, the present invention supports the Next Generation Network (NGN) with the IP Multimedia Subsystem (IMS) as its core. The NGN provides realtime or non-realtime information-like service, multimedia call voice service, enhanced call management, group service, etc., converges various communication media to provide shared communication for realtime online information, so that multiple users can process the same data file in a realtime manner, and the present invention can implement a solution from console game to online entertainment of multimedia communication with multiple users participated online.

With the computer unit and the mobile phone module in this embodiment, a large number of clients with different communication modes can be inquired, managed and traced concurrently at the same platform, which greatly improves the satisfaction of the clients and work efficiency. For example, some clients only hope to or can only communicate by email, some clients only hope to or can only communicate by phone, some clients only hope to or can only communicate by instant messaging tool such as QQ, and some clients only hope to or can only communicate by short message. The present invention avoids not only the clients' antipathy caused by repeatedly disturbing the clients due to the use of different communication modes, but also the difficulty of concentrated management of all voice and data due to that fact that communication and data are all distributed at two different devices and can not be all synchronized, thereby improving the satisfaction of the clients and work efficiency.

Hereinafter is described in detail other multifunctional applications of a rechargeable battery of a computer according to an embodiment of the present invention.

If the extension application function module is a mobile phone module, the mobile phone module may share the SSD with the computer unit, thereby implementing extended communication function based on the rechargeable battery. If the extension application function module is a scanner module, the scanner module may be connected with the computer unit in a wired or wireless mode, thereby implementing extended scanner function based on the rechargeable battery. If the extension application function module is a projector module, the projector module may be connected with the computer unit in a wired (e.g., data line) or wireless mode, thereby implementing extended projector function based on the rechargeable battery. If the extension application function module is a printer module, the printer module may be connected with the computer unit in a wired or wireless mode, thereby implementing extended printer function based on the rechargeable battery. If the extension application function module is an interphone module, the rechargeable battery adopts a standard interphone power interface or rechargeable power interface, thereby implementing interphone function based on the rechargeable battery. If the extension application function module is a micro-optical drive module, the micro-optical drive module may be connected with the computer unit in a wired or wireless mode, thereby implementing micro-optical drive function based on the rechargeable battery. If the extension application function module is a GPS module, the GPS module may be connected with the computer unit in a wired or wireless mode, thereby implementing GPS function based on the rechargeable battery.

The following are specific description.

| | Function category | Application |
|---|---|---|
| Projector module | Enlarge display area | Implement enlarged display area of a project from a range of 3-7 inches to a range of 7-17 inches |
| Mobile phone module | Voice communication function | Implement point-to-point instant voice communication and management of voice and data services at the same platform |
| Interphone module | Voice communication function | Implement point-to-multipoint or multipoint-to-multipoint instant broadcast communication |
| Printer module | Common periphery function | Implement whenever and wherever print of files, invoices, bills, tickets, mails and facsimiles stored in the computer or downloaded from Internet |
| Scanner module | Common periphery function | Implement whenever and wherever transmission of scanned relevant files and pictures via Internet |
| Micro-optical drive module | Common periphery function | Implement optical storage such as software installation, optical disk writing and CD/DVD multimedia play |
| GPS module | Other functions | Implement whenever and wherever global positioning. |

Hereinafter are described in detail related solutions and application instances by taking the projector module as an example.

The 30-ton and room-sized computer has become a less 500 g portable laptop or pocket PC, which may bring some new application problems such as the small display area, which may result in small words, non-ideal display effect of pictures and small display range of webpages. Although these application problems can be adjusted by the zoomin and zoomout keys of the computer or by connecting a television or a display screen to implement multi-person sharing, this may bring a difficulty on how to enlarge the display area in case of no connecting display screen or liquid crystal television. In this embodiment, a coin sized laser projector module is embedded in the multifunctional laptop battery. Although this module is small, it can project a 7 to 17 inch projection area on the wall.

Accordingly, stream media, pictures, words and video content which are stored in the portable laptop or pocket PC or downloaded and transmitted from the Internet are played whenever and wherever, thereby making the air cinema to become a reality. The LCD or LED display screen embedded in the PC may be even replaced, thus forming a non-display screen laptop or pocket PC. Usually, the cost of display screen is usually 30% of the total PC cost, and thus the cost and price of the pocket PC are reduced greatly according to the present invention.

The projector module may be implemented by any of the two approaches: the 3LCD technique or the 1LCD technique.

A Digital Light Processing (DLP) projector module may be manufactured small due to the use of DMD micro-mirror system and integrated in the multifunction laptop battery or mobile phone. This projector module with a length of 1.5 inches includes three beams of laser, a DLP chip and a power. In the DLP chip, tens of thousands of movable micro-mirrors process projections and amplifies the projections on the screen, so that DVD-quality video content can be displayed in projection on the screen or wall and in this case a video player or a television may be obtained. With this projector module, the size of the real "screen" is far larger than the liquid crystal display of the laptop or mobile phone. An embedded projector module may be used to browse webs, enjoy literatures and watch audio-visual entertainment programs, which improves the experience of consumers greatly.

A traditional projector module includes three different LCD panels, which are responsible for outputting three different video signals: red, green and blue. However, the projector module according to the present invention includes only one LCD panel to output the three color signals, thereby reducing the volume and factory cost of the projector. For example, the LCD panel of the projector module according to the present invention is of only 0.24 inches and can be easily integrated in the pocket PC battery or the mobile phone.

The projection technique is a display system which projects the reflected light of a light source to a screen by adjusting the angle of lens: a small scanning mirror projects a beam of light from a semiconductor to an external plane, and the small scanning mirror can be integrated in the pocket PC or the mobile phone. Specifically, the micro-projector should be usually configured to be a two-dimensional scanning mirror structure in case of scanning the reflected lights. Such a structure includes an actuator of a longitudinal scanning mirror and an actuator of a transverse scanning mirror cooperated with the actuator of the longitudinal scanning mirror. To implement display of images, longitudinal scanning and transverse scanning requires the frequencies of 60 Hz and several KHz respectively. Polymer is used in the drive part to implement scanning at the frequency of tens of Hz.

The drive is implemented in the general electromagnism mode, i.e., a permanent magnet and an electromagnet wound around a coin are used for drive. The polymer is used in the movable portion, i.e., supports of the mirrors. A trial-manufactured element has a size of 6 mm×12 mm×3.7 mm. It may be manufactured less small in future. Accordingly, the MEMS technique adaptable to miniaturized design can be applied to the pocket PC battery or the mobile phone, so as to display images in an area of around 7 to 17 inches.

Hereinafter are described in detail related solutions and application instances by taking the scanner module as an example.

The scanner module may be utilized in a wide scope: business man, reporter, architect, engineer, accountant, insurance agent, government official, teacher, student, banking business, insurance business, securities business, lawyer, judicial official, research institute, architecture, real estate development, etc. The present invention can scan files and documents that a general scanner is difficult to or can not scan, for example, building construction drawing, various journalism, book, commercial invoice, commercial contract, poster wall newspaper, picture map, important file, newspaper, journal, book, note, invoice, contract, important file, certificate, planning graph, sketch, textbook, reference material, etc.

The scanner module has a size of only 100 mm×13 mm, a weight of only 30 g, and a scanning resolution of 200 dpi to 600 dpi, and supports four scanning modes: black and white (1 bpp), gray (4/8 bpp), low-accuracy color (12 Bit) and high-accuracy color (24 Bit). Each mode permits users to freely choose the high-accuracy mode or the general mode. The scanner module has a USB interface and a push-to-scan function, supports business card management and document identification management functions, has embedded graphic context recognition software, business card recognition (BCR) software, text recognition (OCR) software (the OCR software can convert scanned print characters into electronic documents and support five kinds of characters: simplified Chinese, complex font Chinese, Korean character, Japanese character and English character), and supports scanning software such as Windows Imaging and PHOTO Shop and other similar image processing OCR software. The device has a feature that a multi-roller stable control system has a 2M to 8M flash memory shared with the computer module. For a black and white document, the flash memory can store content of 400 A4 pages at the most and transmit the stored content to the computer, which brings the advantages of convenience and avoids the troubles of large volume of the general scanner, inconvenient carrying and requisite wired connection.

By taking the flash memory as a buffer and the hard disk of the computer module as an extended storage space of the scanner, the total storage capacity of the scanner module is increased by tens of thousands of times, and can be extended from a few mega bytes to more than a hundred Gigabit bytes.

Besides the above general micro-scanner, a special scanning pen module, a business card scanning module and a micro-bar code scanner module may be arranged in the multifunctional battery according to the present invention.

The micro-bar code scanner may assist shops, repositories, libraries, laboratories and companies with automatic data input to improve product tally and data processing capabilities greatly. The bar code scanner is designed for various bar code products and thus the bar code scanner can scan various kinds of bar codes in different formats. The high performance of the bar code scanner can ensure that all bar code information can be obtained by only one scan, implementing 100% data integrity and avoiding manual input of data, and routine processing automation can meet these requirements. The production efficiency is increased, the total cost is reduced greatly, and part of employees can retrenched to undertake more complex work. A specific algorithm of the bar code scanner not only can read thin, damaged or ambiguous printed characters but also performs well at the aspect of reading various kinds of bar code information. The bar code scanner module has a very finished exterior (with an area of 4.5 square centimeters, a height of 2.2 centimeters and a weight of 2 ounces), adopts customized data output mode and Windows-based interface, and can be integrated in the pocket PC or the laptop.

The business card scanning module takes only three seconds to record a business card, and thus the speed is 60 times less than that of manual input. Like swiping the card, collected business cards are inserted and the information thereof is written into the computer rapidly and automatically. Accordingly, business cards are not piled up and desultory. Business card materials are collected and managed easily. The business card scanning module can automatically understand and accurately recognize the business cards regardless of the layout of the business cards. The business card scanning module can automatically recognize a business card with mixed typeset of simplified and complex font Chinese, English and number. The business card scanning module can accurately recognize nearly a hundred prints and can recognize, with a high recognition ratio and a high speed, up to 12000 words including simplified Chinese, complex font Chinese, Hongkong words. The business card scanning module can perform sort management and rapid search. The business card scanning module spends only one second to search for a business card in a business card database. Besides the business card scanning module searches for a business card by name, mobile phone number and area, it can call a business card, and the called business card from tens of thousands of business cards comes into sight at once. Intelligent fuzzy query can assist to find a business card based on a person's rudimental indistinct memory. Therefore, the troubles of time-wasting and difficult search for a business card are avoided, and business card information is not lost permanently.

The scanning pen module not only supports recognition of various kinds of words and fonts but also can switch easily based on the words and pictures. The scanning pen module has a recognition ratio of 98%, and can easily read more than 600 Chinese words in one minute.

Continuous graphics context scan, instant recognition and immediate transmission can be implemented without any waiting. A mixed typeset text including simplified Chinese and complex font Chinese, English, numbers and special characters of more than a hundred kinds of fonts including Song typeface, regular script, boldface, Wei tablet, clerical script and running script can be recognized in a 98% recognition ratio. Rapid recognition and instant output are implemented, and other complex input operations are avoided. Simplified Chinese and complex font Chinese can be recognized intelligently. Complex font Chinese can be scanned to output simplified Chinese or simplified Chinese can be scanned to output complex font Chinese as required. Floating windows are traced intelligently, which brings convenience to users' check work. The scan can switch based on word or picture. Signature documents are inserted freely. Words can be transmitted to the cursor position directly. A human-based hidden interface does not occupy any screen interface.

Hereinafter are described in detail related solutions and application instances by taking the printer module as an example.

In the following applications, a micro-printer is widely used.

| | | |
|---|---|---|
| Medical treatment | Instrument and meter | Handhold instrument |
| Fire-fighting instrument | Measurement instrument | Mobile device |
| Analysis instrument | Electric power instrument | Information query terminal |
| Weighting instrument | Recording device | Portable instrument |

The output print of the pocket PC avoids manuscript errors and ensures information correctness and reliability. Transaction records are provided instantly, and mobile business can be fully met.

Taking a portable thermal printer as an example, the microprinter may be used together with the supporting pocket PC. The portable thermal printer features a small volume, a light weight, a reliable performance, a free connection and convenient use, and is adaptable to an outdoor work environment. There are the following adaptation fields: mobile police system, tobacco distribution system, public utility meter reading system, mobile business/mobile physical distribution system, portable Instrument and meter/detection device, supporting device, etc.

Hereinafter are described in detail related solutions and application instances by taking the GPS module as an example.

GPS is commonly used by self-driving traveler, field explorer and hikers. With the development of times and the progress of science and technology, people's living standard steadily improves, and more and more cars come into ordinary families. Related automobile consumption increases accordingly, which drives rapid establishment of a whole industrial chain. Immediately, private cars become a life style of many fashionable consumers. The self-driving travel nearly becomes a focus of discussion from clan owing cars. Facing strange city and traffic movement, it is very important for car owners to bring an electronic guider with them to save plenty of time and oil cost. Many second-sighted manufacturers have ever performed research and development on navigation products, and GPS products emerge like tidewater immediately with the mature of the market.

The GPS module according to the present invention is categorized into two kinds: embedded module and detachable module.

The embedded module adopts the SiRF III or Hammerhead II chip, which is the smallest GPS receiver wafer all over the world and integrates the techniques of LNA, RF down-converter and signal processing base frequency on one RF CMOS granule. Therefore, the extra small single monocrystalline wafer has a size of only 3.74 mm×3.59 mm×0.6 mm and a total size of 14 square mm, and thus may be called the smallest GPS receiver all over the world. Although the GPS receiver has the smallest volume all over the world, it can provide a sensitivity up to −160 dBm and take one second for positioning, which can meet the requirements of high performance, low power and extra small portal device and mobile phone.

The detachable module is in a wireless blueteeth connection mode or a wired USB connection mode.

With the rapid development of blueteeth technique, more and more GPS modules are independent and are connected in the blueteeth connection mode. Many palm devices with blueteeth function may become a GPS satellite navigator after corresponding software is installed. The smallest blueteeth GPS receiver all over the world has a volume size of 64×22×16 mm. The GPS receiver containing the battery has a weight of only 40 g. The GPS receiver has a built-in US SiRF III power-saving GPS satellite positioning receiver chip, which may trace signals of twenty satellites at most.

An extra small GPS USB device is a portable notebook computer or an Ultra Mobile PC (UMPC) with the satellite positioning function. Microsoft™ Streets & Trips, AutoRoute and other application software may be installed in the extra small GPS USB device, which may apply to navigation, track record, record of interesting places, GeoTagging, etc. A person can share his experience and future memories via online map or online satellite map.

Hereinafter are described in detail related solutions and application instances by taking the interphone module as an example.

The radio interphone is widely used:

1. lover intercommunication, mother and baby intercommunication, career of old man, intercommunication between wards, police arrest, building construction;

2. Intercommunication between buildings, security protection, school teaching, government meeting, drill, travel and climbing;

3. Shopping, present in festival, present between colleagues and classmates;

4. Public relations firm/production company, entertainment place, festival service, organization of large-scale activity, travel agency, building/decoration company, and community service.

It is very important for an overall communication tool with full function and 24-hour service function to be used whenever and wherever. Instant contact is necessary in travel, expedition, shopping mall, large-scale open concert, large-scale celebration activity and hidden military action in enemy's rear area. However, there are not telephone lines or mobile phone signals in some of these places, and in this case, the digital radio interphone module can play its role of supplementary communication.

The radio interphone module in the embedded mode and detachable mode according to the present invention can implement free, push-to-talk, one-to-one, one-to-multiple, multiple-to-multiple, network limitation-independent, charge-free, license-free, and clear-speaking (automatic noise-restrained function) intercommunication. The radio interphone module has a small volume (only a size of a common electronic watch), a light weight (only 18 g), a long work time, a long coverage distance up to 3 km. In the radio interphone module, the switch mode is not manually operated (sound control), there are tens of channels for arbitrary selection. The radio interphone module has a multi-party conference function, an extra liquid crystal display, an automatic locking function and a standby function, and can implement one-to-one, one-to-multiple, and multiple-to-multiple communication.

Through the combination with the pocket PC, the functions of the computer and the interphone can be implemented concurrently. Accordingly, smooth communication can be achieved in case of either absence or presence of mobile phone signals and network signals, thereby implementing the full functional and 24-hour serviceable communication whenever and wherever.

Figure 3:
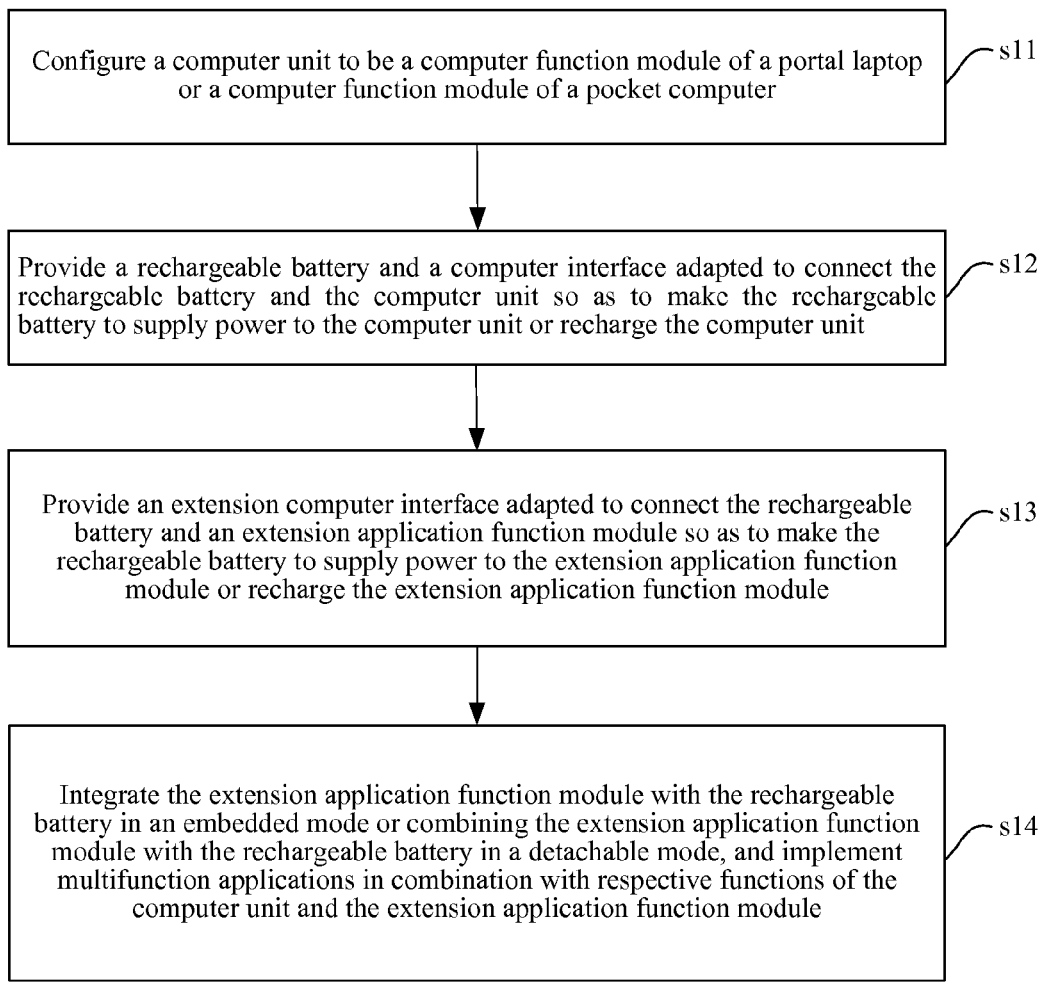
FIG. 3 is a flowchart of a multifunctional computer rechargeable battery application method according to the present invention.

FIG. 3 is a flowchart of a computer multifunctional rechargeable battery application method according to the present invention, which includes the following steps:

In step s11, a computer unit is configured to be a computer function module of a portal laptop or a computer function module of a pocket computer. In specific implementation, the computer unit should be miniaturized for miniaturization of a device so as to integrating other functions. Therefore, the configuration of the computer function module of the portal laptop or the computer function module of the pocket computer is adopted here.

In step s12, there is provided a rechargeable battery and a computer interface adapted to connect the rechargeable battery and the computer unit so as to make the rechargeable battery to supply power to the computer unit or recharge the computer unit. In specific implementation, the computer interface is a common computer power interface.

In step s13, there is provided an extension computer interface adapted to connect the rechargeable battery and an extension application function module so as to make the rechargeable battery to supply power to the extension application function module or recharge the extension application function module. In specific implementation, in view of different extension application function modules, the extension computer interface corresponds to the extension application function modules, details of which are described above for reference and are not discussed here.

In addition, in step s14 according to the present invention, the extension application function module is integrated with the rechargeable battery in an embedded mode or the extension application function module is combined with the rechargeable battery in a detachable mode, and multifunctional applications are implemented in combination with the respective functions of the computer unit and the extension application function module. The multifunctional applications may be, for example, an integrated application of computer and mobile phone functions, an integrated application of computer and projector functions, an integrated application of computer and scanner functions, and an integrated application of computer and printer functions. Other examples are omitted here.

The above are preferred embodiments of the present invention. It should be noted that an ordinary skill in the art can make various modifications without departing from the principle of the present invention. These modifications should be deemed as falling into the scope of the present invention.

What is claimed is:

1. A multifunctional computer rechargeable battery application system, comprising: a computer unit, a rechargeable battery of the computer, and a computer interface adapted to connect the rechargeable battery and the computer unit so as to make the rechargeable battery to recharge the computer unit or supply power to the computer unit, wherein the computer unit is configured to be a computer function module of a portal laptop or a computer function module of a pocket computer, and the multifunctional computer rechargeable battery application system further comprises an extension application function module, wherein the rechargeable battery is configured to supply power to the extension application function module or recharge the extension application function module, and the extension application function module is integrated with the rechargeable battery in an embedded mode or combined with the rechargeable battery in a detachable mode.

2. The multifunctional computer rechargeable battery application system according to claim 1, wherein the extension application function module is a mobile phone module which is connected with the computer in a wired or wireless mode.

3. The multifunctional computer rechargeable battery application system according to claim 1, wherein the extension application function module is a mobile phone module which shares a solid state disk (SSD) with the computer unit.

4. The multifunctional computer rechargeable battery application system according to claim 1, wherein the extension application function module is a scanner module which is connected with the computer unit in a wired or wireless mode.

5. The multifunctional computer rechargeable battery application system according to claim 1, wherein the extension application function module is a projector module which is connected with the computer unit in a wired or wireless mode; or the extension application function module is a printer module which is connected with the computer unit in a wired or wireless mode.

6. The multifunctional computer rechargeable battery application system according to claim 1, wherein the extension application function module is a Global Positioning System module which is connected with the computer unit in a wired or wireless mode; or the extension application function module is a micro-optical drive module which is connected with the computer unit in a wired or wireless mode.

7. The multifunctional computer rechargeable battery application system according to claim 1, wherein the extension application function module is an interphone module, the rechargeable battery adopts a detachable interphone power interface or rechargeable power interface.

8. A multifunctional computer rechargeable battery application method, comprising:

configuring a computer unit to be a computer function module of a portal laptop or a computer function module of a pocket computer;

providing a rechargeable battery and a computer interface adapted to connect the rechargeable battery and the computer unit so as to make the rechargeable battery to supply power to the computer unit or recharge the computer unit;

providing an extension computer interface adapted to connect the rechargeable battery and an extension application function module so as to make the rechargeable battery to supply power to the extension application function module or recharge the extension application function module; and integrating the extension application function module with the rechargeable battery in an embedded mode or combining the extension application function module with the rechargeable battery in a detachable mode, and implementing multifunctional applications in combination with respective functions of the computer unit and the extension application function module.

9. The multifunctional computer rechargeable battery application method according to claim 8, wherein the extension application function module is any one of the following: a mobile phone module, a projector module, a scanner module, a printer module, an interphone module, a Global Positioning System module, and a micro-optical drive module; the rechargeable battery extends the computer interface by correspondingly adopting a power interface or a recharge power interface corresponding to the standard mobile phone module, the projector module, the scanner module, the printer module, the interphone module, the GPS module or the micro-optical drive module.

10. The multifunctional computer rechargeable battery application method according to claim 8, wherein the computer unit is connected with the extension application function module in a wired or wireless mode.

* * * * *